United States Patent Office 3,379,788
Patented Apr. 23, 1968

3,379,788
SELECTIVE SOLVENT FOR UNSATURATED
HYDROCARBONS
Herman S. Bloch, Skokie, and Richard C. Wackher, Palatine, Ill., assignors to Universal Oil Products Company, Des Plaines, Ill., a corporation of Delaware
No Drawing. Filed Mar. 18, 1964, Ser. No. 352,986
9 Claims. (Cl. 260—674)

This invention relates to the separation of organic compounds having different degrees of saturation and more particularly to a novel solvent therefor and to a process using the same.

The invention is particularly applicable to the treatment of hydrocarbon fractions which, as usually recovered from various sources, contain saturated and unsaturated hydrocarbons. For example, normally liquid products of a cracking process contain olefins, aromatics, paraffins and naphthenes. Similarly, the products recovered by distillation of crude oil contain paraffins, naphthenes, aromatics and, in most cases, a small amount of olefins. Likewise, normally gaseous products of a cracking process contain olefinic gases such as propylene and butylenes, and paraffinic gases such as propane and butanes.

It is an object of this invention to provide a method for the separation of mixtures of two or more compounds by means of a selective solvent. Another object of this invention is to provide a method for the separation of relatively more saturated hydrocarbons from those less saturated hydrocarbons contained in mixtures thereof, by extraction with a particular selective solvent. A further object of this invention is to provide a new and improved solvent for the separation of compounds according to their degree of saturation. A more specific object of this invention is to separate saturated from unsaturated hydrocarbons through the employment of a new and improved selective solvent which is selective for unsaturated hydrocarbons.

In many cases it is desirable to separate the unsaturated from the saturated hydrocarbons but this cannot be accomplished by purely fractional distillation means in practical operation because of the similarity in boiling points of the various hydrocarbons.

Other organic compounds are likewise recovered from various sources including synthetic processes wherein the products contain organic compounds of different degrees of saturation. For example, saturated and unsaturated glycerides are frequently recovered in admixture and their separation cannot be effected purely by fractional distillation in practical operations.

In a broad aspect the present invention relates to a process for separating a mixture of organic compounds of different degrees of saturation which comprises treating said mixture with a selective solvent comprising a diol of the general formula:

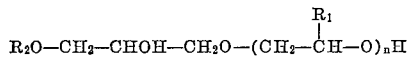

wherein $R_1$ is selected from the group consisting of hydrogen and methyl radical, $R_2$ is an aryl group and $n$ is a number from one to three.

In still another aspect the present invention relates to a process for separating a mixture of hydrocarbons having different degrees of saturation and similar boiling points which cannot readily be separated by purely fractional distillation means which comprises treating said hydrocarbons with a solvent comprising a diol of the general formula:

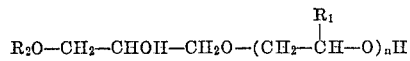

wherein $R_1$ is selected from the group consisting of hydrogen and methyl radical, $R_2$ is an aryl group and $n$ is a number from one to three.

The present invention is particularly applicable to the treatment of either normally gaseous or normally liquid hydrocarbon fractions for the separation of relatively unsaturated from relatively saturated hydrocarbons. As used in the present specification and claims, the terms "saturated hydrocarbons" and "unsaturated hydrocarbons" are used relative to each other; for example, the term "saturated hydrocarbons" is intended to include hydrocarbons having a lower molecular ratio of carbon to hydrogen than the empirical formula of $C_nH_{2n-12}$ when such hydrocarbons are compared with those of higher ratio, while the term "unsaturated hydrocarbons" is intended to include hydrocarbons having a higher molecular ratio of carbon to hydrogen than the empirical formula of $C_nH_{2n+2}$ when such hydrocarbons are compared with those of lower ratio. The olefins include both the mono- and polyolefinic hydrocarbons and may be included either within the saturated hydrocarbons or the unsaturated hydrocarbons depending upon the point of reference; i.e., the type of feed stock being processed and the classes of hydrocarbons which are to be separated.

Thus, the invention may be utilized for the separation of olefins and/or aromatics (including naphthalene and other polycyclic types) from paraffins and/or naphthenes, the separation of aromatics from olefins and the separation of naphthenes from paraffins. Likewise, the invention may be utilized for the separation of monoolefins from diolefins, the monoolefins being less unsaturated than the diolefins.

The present invention is characterized by a novel solvent which comprises a diol of the general formula:

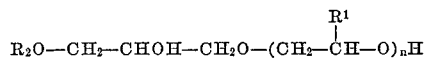

where $R_1$, $R_2$ and $n$ are as hereinbefore defined. Such compounds are easily prepared by a reaction of an excess of phenyl glycidyl epoxide with a glycol such as ethylene glycol, diethylene glycol, propylene glycol, tripropylene glycol and the like, using a large excess of glycol so that only a single epoxide molecule will react with any one glycol molecule. Alternatively, they may be made by the reaction of an aryl glyceryl ether with an appropriate amount of ethylene oxide or propylene oxide.

Typical solvents that fall within this general formula are: 1-phenoxy-2,6-dihydroxy-4-oxahexane, 1-phenoxy-2,9-dihydroxy-4,7-dioxanonane, 1-phenoxy-2,12-dihydroxy-4,7,10-trioxadodecane and 1-phenoxy-2,6-dihydroxy-4-oxaheptane.

It is understood that the various alternative compounds which may be employed in accordance with the present invention as hereinbefore set forth are not necessarily equivalent in their effectiveness as a selective solvent for the separation of organic compounds and particularly hydrocarbons. The choice as to the particular solvent to be employed with any given charge stock to be subjected to extraction will depend upon the characteristics of the charging stock and the type of separation to be effected.

The solvent of the present invention are, in most cases, obtainable in the open market or if a particular solvent is not so obtainable, it may be readily synthesized by well-known means.

The operation of the solvent extraction process is relatively simple and may comprise introducing the hydrocarbon mixture to be extracted into a suitable extraction zone. The extraction zone may or may not contain baffle plates, bubble decks, side-to-side pans, or the like. The extraction zone may be equipped with stirring or other contacting means in order to obtain efficient contacting of the hydrocarbons and the solvent. The solvent extraction is effected under conditions of temperature and pressure in order to form an extract phase containing a major portion of the solvent and a major portion of the unsaturated hydrocarbons, and a raffinate phase containing a major portion of the saturated hydrocarbons.

The temperature employed is preferably atmospheric or slightly superatmospheric, but it should be high enough to maintain the solvent in the liquid phase in case it is solid at ordinary temperatures, but must be below that at which the decomposition of the solvent or hydrocarbons occur. Typical temperature ranges are from atmospheric to 500° F. Preferable temperature ranges are from 200° F. to 450° F., depending upon the molecular weight of the hydrocarbon and the water content in the solvent. It is preferable to avoid exposure of the solvent to oxygen or air to prevent undesirable side reactions and equipment fouling problems at said preferable temperature range. Temperatures in excess of 500° F. should be avoided to prevent solvent decomposition. The pressure to be employed is usually atmospheric or moderately superatmospheric but likewise should be sufficient to maintain the hydrocarbons and solvent in liquid phase. When treating normally gaseous hydrocarbons, a higher superatmospheric pressure is employed in order to maintain the hydrocarbons in substantially liquid phase. Typical pressure ranges are from 1 to 70 atmospheres. Preferable pressure ranges are from 3 to 20 atmospheres.

It is within the scope of the invention to add water or similar polar materials to the hydrocarbons and/or solvent when the hydrocarbons are more soluble in the solvent than desirable. The addition of water in this case serves to decrease the solubility of hydrocarbons and also to increase the selectivity of the solvent. Frequently it is necessary to add water, especially to extract mixtures so rich in aromatics or olefins as to be mutually miscible with the solvent. Typical concentrations of water in said solvent are from 0 to 40 wt. percent. Preferable concentrations are from 2 to 25 wt. percent water in said solvent.

Usually more than one extraction (i.e., several stages) are required in order to effect substantially complete separation of the unsaturated from the saturated hydrocarbons. In some cases, however, one extraction may be sufficient when it is required only to slightly lower the concentration of the unsaturated hydrocarbons in the mixture or in case the charging stock originally contains only a small percentage of unsaturated hydrocarbons.

After formation of the extract and raffinate phases, the solvent may be separated from the hydrocarbons by various means including: (1) distillation at increased temperature and/or reduced pressure; (2) adding water or the like in order to decrease the solubility of the hydrocarbons in the solvent; and (3) counterextracting the hydrocarbons from the solvent by contacting the extract phase with a secondary solvent which is immiscible with the first solvent and may comprise, for example, a paraffinic or naphthenic hydrocarbon of higher or lower boiling point than the solute. The second solvent is then separated from the solute by ordinary fractional distillation means.

The following examples are introduced for the purpose of further illustrating the novelty and utility of the present invention but not with the invention of limiting the same.

EXAMPLE I

One hundred ml. of test mixture containing 25 volume percent benzene and 75 volume percent methylcyclopentane and 300 ml. of solvent containing 11.7 wt. percent water and 88.3 wt. percent 1-phenoxy-2,6-dihydroxy-4-oxahexane are thoroughly agitated at 121° C. in a single stage batch mixing apparatus. On ceasing the agitation, a raffinate and extract phase form. The composition of the hydrocarbon portion of the extract phase is 44 volume percent benzene and 56 volume percent methylcyclopentane. The concentration of the benzene in the hydrocarbon portion of the raffinate phase is 22.1 volume percent. By additional extractions it is possible to reduce the benzene content in the raffinate to a very low figure.

EXAMPLE II

One hundred ml. of test mixture containing 25 volume percent benzene and 75 volume percent methylcyclopentane and 300 ml. of solvent containing 17.5 wt. percent water and 82.5 wt. percent 1-phenoxy-2,6-dihydroxy-4-oxahexane are thoroughly agitated at 121° C. in a single stage batch mixing apparatus. On ceasing the agitation, a raffinate and extract phase form. The composition of the hydrocarbon portion of the extract phase is 49.5 volume percent benzene and 50.5 volume percent methylcyclopentane. The concentration of the benzene in the hydrocarbon portion of the raffinate phase is 22.5 volume percent. By additional extractions it is possible to reduce the benzene content of the raffinate to a very low figure.

We claim as our invention:

1. A process for separating a mixture of organic compounds of different degrees of saturation which comprises treating said mixture with a solvent comprising a diol of the general formula:

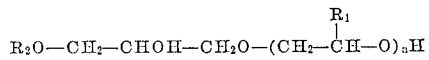

wherein $R_1$ is selected from the group consisting of hydrogen and methyl radical, $R_2$ is an aryl group and $n$ is a number from one to three.

2. A process for separating a mixture of hydrocarbons of differing degrees of saturation which comprises treating said mixture with a selective solvent comprising a diol of the general formula:

wherein $R_1$ is selected from the group consisting of hydrogen and methyl radical and $n$ is a number from one to three.

3. A process for separating unsaturated hydrocarbons from saturated hydrocarbons which comprises treating a mixture of unsaturated and saturated hydrocarbons with a selective solvent comprising a diol of the general formula:

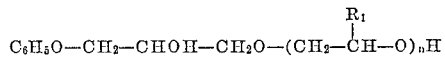

wherein $R_1$ is selected from the group consisting of hydrogen and methyl radical and $n$ is a number from one to three, under conditions to form an extract phase and a raffinate phase.

4. The process of claim 3 further characterized in that said unsaturated hydrocarbons comprise aromatics.

5. The process of claim 3 further characterized in that said unsaturated hydrocarbons comprise olefins.

6. A process for separating a mixture of organic compounds of different degrees of saturation which comprises treating said mixture with a solvent comprising water and a diol of the general formula:

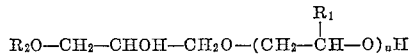

wherein $R_1$ is selected from the group consisting of hydrogen and methyl radical, $R_2$ is an aryl group and $n$ is a number from one to three.

7. A process for separating a mixture of hydrocarbons of differing degrees of saturation which comprises treating said mixture with a selective solvent comprising water and a diol of the general formula:

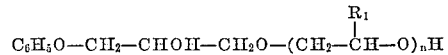

wherein $R_1$ is selected from the group consisting of hydrogen and methyl radical and $n$ is a number from one to three.

8. A process for separating unsaturated hydrocarbons from saturated hydrocarbons which comprises treating a mixture of unsaturated and saturated hydrocarbons with a selective solvent comprising a diol of the general formula:

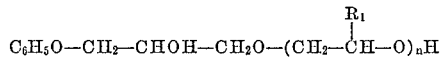

wherein $R_1$ is selected from the group consisting of hydrogen and methyl radical and $n$ is a number from one to three, in concentrations from 75 to 98% by weight and water in concentrations from 25 to 2% by weight, under conditions to form an extract phase and a raffinate phase.

9. The process of claim 8 further characterized in that the glycol is 1-phenoxy-2,6-dihydroxy-4-oxahexane.

References Cited
UNITED STATES PATENTS

| 2,176,746 | 10/1939 | Pokorny et al. | 260—676 |
| 2,786,085 | 3/1957 | Bloch | 260—674 |
| 2,834,820 | 5/1958 | Bloch | 260—674 |

DELBERT E. GANTZ, *Primary Examiner.*

C. E. SPRESSER, *Assistant Examiner.*